United States Patent
Disch et al.

(10) Patent No.: US 11,608,233 B2
(45) Date of Patent: Mar. 21, 2023

(54) SYSTEM FOR LOADING DIFFERENT CONVEYING TRACKS OF AT LEAST ONE DISHWASHER, AND DISHWASHER ARRANGEMENT HAVING SUCH A SYSTEM

(71) Applicant: ILLINOIS TOOL WORKS INC., Glenview, IL (US)

(72) Inventors: Harald Disch, Elzach (DE); Martin Schrempp, Biberach (DE); Adrian Boldt, Offenburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 66 days.

(21) Appl. No.: 17/243,108

(22) Filed: Apr. 28, 2021

(65) Prior Publication Data

US 2021/0347585 A1 Nov. 11, 2021

(30) Foreign Application Priority Data

May 5, 2020 (DE) ...................... 10 2020 112 090.7

(51) Int. Cl.

| | |
|---|---|
| *B65G 47/90* | (2006.01) |
| *A47L 15/00* | (2006.01) |
| *A47L 15/24* | (2006.01) |
| *B07C 5/36* | (2006.01) |
| *B65G 47/71* | (2006.01) |
| *B65G 47/91* | (2006.01) |
| *B65G 47/92* | (2006.01) |
| *B07C 5/04* | (2006.01) |
| *B07C 5/34* | (2006.01) |

(52) U.S. Cl.
CPC ........ *B65G 47/905* (2013.01); *A47L 15/0076* (2013.01); *A47L 15/248* (2013.01); *B07C 5/362* (2013.01); *B65G 47/71* (2013.01); *B65G 47/91* (2013.01); *B65G 47/92* (2013.01); *B07C 5/04* (2013.01); *B07C 5/3408* (2013.01)

(58) Field of Classification Search
None
See application file for complete search history.

(56) References Cited

U.S. PATENT DOCUMENTS

| | | | |
|---|---|---|---|
| 3,486,939 | A | 12/1969 | Pinckard |
| 9,944,466 | B2 * | 4/2018 | Disch .................. A47L 15/0092 |
| 2010/0043834 | A1 | 2/2010 | Scheringer |

FOREIGN PATENT DOCUMENTS

| | | |
|---|---|---|
| EP | 2720597 B1 | 2/2016 |
| WO | WO 2012173479 A1 | 12/2012 |

* cited by examiner

*Primary Examiner* — William R Harp
(74) *Attorney, Agent, or Firm* — Thompson Hine LLP (57) ABSTRACT

A system (10) for loading different conveying tracks (2, 3, 4) of at least one in particular commercial conveyor dishwasher (1, 1'). The system (10) includes a feed conveyor belt (11) for delivering washware (9a, 9b, 9c) to loading regions of the at least one conveyor dishwasher (1, 1'). The system (10) further includes a sorting arrangement for sorting the washware (9a, 9b, 9c) delivered to the loading regions of the at least one conveyor dishwasher (1, 1') via the feed conveyor belt (11) according to previously defined or definable washware groups. The sorting arrangement is associated with at least one loading arrangement (13a, 13b, 13c) for automatically loading the different conveying tracks of the at least one conveyor dishwasher (1, 1') with washware (9a, 9b, 9c) of one of the previously defined or definable washware groups.

9 Claims, 6 Drawing Sheets

SYSTEM FOR LOADING DIFFERENT CONVEYING TRACKS OF AT LEAST ONE DISHWASHER, AND DISHWASHER ARRANGEMENT HAVING SUCH A SYSTEM

TECHNICAL FIELD

The present invention relates to a conveyor dishwasher arrangement and a system for loading different conveying tracks of at least one conveyor dishwasher, in particular a conveyor dishwasher arrangement.

BACKGROUND

Conveyor dishwashers of the conveyor dishwasher arrangement according to the invention are in particular commercial conveyor dishwashers and can be configured as belt conveyor dishwashers or as rack conveyor dishwashers.

Conveyor dishwashers (conveyor warewashers) are used in the commercial sector. Unlike domestic dishwashers, in which the washware to be cleaned remains stationary in the machine during cleaning, in conveyor dishwashers the washware is transported through different treatment zones of the machine.

In conveyor dishwashers, the washware, such as trays, dishes, pots, glasses, cutlery and other utensils to be cleaned, are conveyed through a number of treatment zones, such as prewash zone(s), main wash zone(s), postwash or prerinse zone(s), final rinse zone(s) and drying zone(s). A conveyor apparatus is used to transport washware in a conveying direction through the conveyor dishwasher, which usually comprises at least one conveying track with compartments for receiving washware. In a belt conveyor dishwasher, the compartments can be formed by support fingers on a conveyor belt of the conveyor apparatus which defines the conveying track. In rack conveyor dishwashers, dish racks, in which compartments can be configured to receive the washware to be treated, are used as the conveyor apparatus. It is conceivable for the dish racks to be transported through the rack conveyor dishwasher by means of a conveying device of a conveying track.

The washware to be cleaned is typically presorted before being placed into the conveyor belt. A rack conveyor dishwasher is known from Document U.S. Pat. No. 6,530,996 B2, for example, in which the washware to be treated is delivered to the respective treatment zones presorted in dish racks.

Conveyor dishwashers are used in particular in large facilities such as dining halls and cafeterias to clean large quantities of soiled washware as economically as possible. With the conveyor dishwashers of the currently known type, it is possible to clean several hundred place settings per hour. Studies have shown that, on average, each place setting typically consists of a tray, a plate, one to two bowls, a drinking glass and a set of cutlery.

In almost all large kitchens, such as company cafeterias or dining halls, the washware used by the meal participants (dishes, drinking glasses, cutlery, etc.) is returned on trays. From the return station, the place settings are transported to the scullery. The place settings are typically transported by a corresponding feed conveyor belt. The place setting is conveyed by a conveyor belt from the return station into the scullery directly to a loading region of the conveyor dishwasher.

In the loading or intake region of the conveyor dishwasher, the washware items are then usually removed manually by service personnel and sorted into the conveyor belt of the conveyor dishwasher.

With regard to trays or tray-like articles, presorting is usually carried out in such a way that the set of dishes and cutlery is removed manually from a tray to be cleaned by the service personnel, and the tray is then stacked in front of the conveyor apparatus or in the intake region (soiled side) of the conveyor dishwasher. From time to time, the trays from this stack of trays are placed by themselves into the conveyor belt of the conveyor dishwasher and cleaned.

This one item approach has the advantage that trays cannot cast a spray shadow on smaller washware items stacked behind the trays. This approach also makes the work flow of stacking and unstacking much easier and more efficient than mixing the washware in with the trays to be cleaned.

While the trays from this stack of trays are placed by themselves into the conveyor belt of the conveyor dishwasher and cleaned, however, it is not possible to clean other washware, such as plates, bowls or other dishes, because the trays to be placed into the conveyor belt usually have to be placed into the conveyor belt transverse to the conveying direction and thus fill the entire available surface of the conveyor belt. Therefore, compared to other types of washware, a relatively large amount of time has to be spent cleaning trays.

What is more, the service personnel of the conveyor dishwasher have to include each tray into their work flow at the machine entrance twice: the first time when removing the cutlery and dishes from the tray to be cleaned and the second time when actually placing the trays into the conveyor belt of the conveyor dishwasher.

In the described work process, the manual effort is particularly high. Every washware item (dish) of every place setting has to individually be removed manually from the tray and placed into the conveyor belt of the dishwasher.

Furthermore, the individual pieces of cutlery of each place setting have to be removed manually from the tray and likewise delivered to the conveyor dishwasher. This is followed by the previously described treatment of the actual trays.

With a machine capacity of several thousand plates per hour, it is in particular important to work as quickly and efficiently as possible, which increases the physical strain on the service personnel.

SUMMARY

Based on this problem, the underlying object of the present invention is to provide a solution for conveyor dishwashers of the type mentioned at the beginning, in which it is possible to configure the entire washing and rinsing process more efficiently, as a result of which in particular the working time of the washing personnel can be decreased and the consumption of resources of the dishwasher arrangement can be reduced.

The invention accordingly relates in particular to a system for the preferably automatic or at least partly automatic loading of different conveying tracks of at least one in particular commercial conveyor dishwasher, whereby the system comprises a feed conveyor belt for delivering washware to loading regions of the at least one conveyor dishwasher and a sorting arrangement for the preferably automatic or at least partly automatic sorting of the washware delivered to the loading regions of the at least one conveyor dishwasher via the feed conveyor belt, specifically according to previously defined or definable washware groups.

The sorting arrangement can, for example, be configured to sort the washware delivered via the feed conveyor belt according to at least the following washware groups:

a first washware group, which comprises cutlery and/or pieces of cutlery made of metal, in particular stainless steel;

a second washware group, which comprises trays and tray-like articles made of a plastic material; and a third washware group, which comprises dishes, in particular plates, cups and/or bowls, made of porcelain or a porcelain-like material.

In addition to this, it is optionally conceivable for the sorting arrangement to be configured to further sort the washware delivered via the feed conveyor belt according to at least one of the following washware groups:

a fourth washware group, which comprises drinking glasses and/or bowls made of glass or a glass-like material; and a fifth washware group, which comprises containers, in particular GN containers, pots and/or pans made of a metal, in particular stainless steel.

According to the invention, it is in particular provided that the sorting arrangement of the loading system is associated with at least one loading arrangement for automatically loading a dedicated conveying track of the at least one conveyor dishwasher associated with the at least one loading arrangement with washware of one of the previously defined or definable washware groups, such as with washware according to the first, second or third washware group.

With the loading system according to the invention, the conveyor dishwasher arrangement can be configured with a variety of expansion stages for the automation of manual loading and unloading work steps. A first expansion stage can consist of the conveyor dishwasher arrangement comprising only one conveyor dishwasher, whereby, in addition to a main conveyor belt, the one conveyor dishwasher of the conveyor dishwasher arrangement also has a tray track (tray conveyor belt), whereby this tray track is preferably disposed parallel to the main conveyor belt.

In this expansion stage, the place settings, for example, are placed directly onto the feed conveyor belt of the loading system by either the meal participant or the washing personnel, as already described. The feed conveyor belt then conveys the place settings to the intake or loading region of the conveyor dishwasher. There, the cutlery and dishes are removed manually from the trays. The manually removed dishes are then manually sorted into the main conveyor belt of the conveyor dishwasher. The removed pieces of cutlery can be collected in racks and then cleaned in the conveyor dishwasher.

With the first expansion stage, the trays are no longer sorted into the dishwasher manually. They are conveyed further in parallel via the feed conveyor belt in the direction of the machine intake of the conveyor dishwasher and there automatically placed into a special tray conveyor belt (tray track) via a single cycle device or setting device. This tray track preferably runs parallel to the main conveyor belt.

According to a second expansion stage, a separate cutlery track can be provided in addition to the aforementioned tray track. This cutlery track preferably likewise runs parallel to and directly adjacent to the tray track. However, in this context it is also conceivable that the tray track is part of a conveyor apparatus of a first conveyor dishwasher of the conveyor dishwasher arrangement and that the cutlery track is part of a conveyor apparatus of a second conveyor dishwasher of the conveyor dishwasher arrangement.

As previously described, the place settings are conveyed to the intake or loading region of one of the conveyor dishwashers of the conveyor dishwasher arrangement via the feed conveyor belt of the loading system. In this second expansion stage, now only the dishes and glasses have to be removed manually from the delivered trays and sorted into a main conveyor belt of the conveyor dishwasher or into a main conveyor belt of a further conveyor dishwasher.

The tray and the cutlery on it remain on the feed conveyor belt. Said tray is conveyed further to a single cycle device for cutlery, for example a cutlery lifting magnet. Here, the pieces of cutlery can be automatically removed from the trays and placed into a cutlery track of one of the conveyor dishwashers of the conveyor dishwasher arrangement. The tray is then conveyed to the single cycle device, where it is automatically loaded into a tray track of one of the conveyor dishwashers of the conveyor dishwasher arrangement.

To further reduce the manual handling steps necessary for loading the at least one conveyor dishwasher of the conveyor dishwasher arrangement, the loading system according to the invention provides that plates and bowls can also be automatically sorted into the at least one conveyor dishwasher and in particular into a main conveyor belt of the at least one conveyor dishwasher.

In this way, manual work steps and thus the workload for the washing personnel can be reduced overall, because, ideally, the washing personnel no longer have to load the conveyor dishwasher(s) manually. The loading system according to the invention in particular ensures the most ergonomic and user-friendly operation of the at least one conveyor dishwasher possible, because a manual loading of the washware items into the conveyor dishwasher(s) is no longer necessary.

In addition to this, the loading system according to the invention improves the cleaning result of the dishwasher arrangement, because all washware of a defined washware group is uniformly oriented on a conveying track of the at least one conveyor dishwasher provided for this washware.

It is also possible to simplify the unloading process, because each washware group can be transported through the at least one conveyor dishwasher of the conveyor dishwasher arrangement on a defined conveying track, and thus arrives at the unloading region of the conveyor dishwasher arrangement already presorted.

To be able to sort the washware delivered to loading regions of the at least one conveyor dishwasher via the feed conveyor belt of the loading system according to the invention according to the previously defined or definable washware groups, according to embodiments of the loading system according to the invention it is provided that the sorting arrangement is configured to sort the washware items delivered via the feed conveyor belt depending on their material, size and/or shape in accordance with the previously defined or definable washware groups.

For example, it is conceivable that the sorting arrangement is configured to automatically differentiate the washware to be treated in the at least one conveyor dishwasher. For this purpose, the sorting arrangement can be associated with a washware detector apparatus, which is used to determine the type of the washware items delivered via the feed conveyor belt (plates, cups, bowls, cutlery, trays, drinking glasses, etc.) and then assign each determined type of washware to a previously defined or definable washware group.

For this purpose, the sorting arrangement can be associated with a corresponding washware detector apparatus, which is used to determine the type of the washware items delivered via the feed conveyor belt.

The term "washware detector apparatus" used here is to be understood to be any detection apparatus designed to detect or determine the type of the washware items delivered via the feed conveyor belt. It is in particular conceivable here that the washware detector apparatus comprises at least one detector device, with which the size, the shape and/or the material of the washware items delivered via the feed conveyor belt can be determined.

According to conceivable implementations, the washware detector apparatus can comprise at least one preferably optically, inductively or capacitively operating detector device, so that the size, the shape and/or the material of the respective washware item can be determined for the purpose of identifying the type of washware. However, it is also possible to use other types of detectors, such as inductive proximity sensors, light scanners, light curtains, laser scanners, 3D lasers, cameras, rotary encoders, etc., as the detector device.

The washware detector apparatus is preferably disposed in front of the sorting arrangement, and in particular in front of the at least one loading arrangement associated with the sorting arrangement, so that the type of the delivered washware can be determined and the corresponding loading arrangement can be actuated.

According to embodiments, the sorting arrangement of the loading system according to the invention and/or the washware detector apparatus associated with the sorting arrangement is designed to automatically detect at least the following washware:

plates made of porcelain or a porcelain-like material;
  cups made of porcelain or a porcelain-like material, glass or a glass-like material;
  bowls made of porcelain or a porcelain-like material, glass or a glass-like material;
  trays or tray-like articles made of a plastic material;
  containers, in particular GN containers, made of a metal, in particular stainless steel;
  pots made of a metal, in particular stainless steel;
  pans made of a metal, in particular stainless steel;
  cutlery or pieces of cutlery made of a metal, in particular stainless steel;
  drinking glasses made of glass or a glass-like material; and
  drinking cups made of plastic.

According to embodiments of the loading system according to the invention, the sorting arrangement is not only configured to determine the type of washware of the washware items delivered via the feed conveyor belt automatically, but also by means of the additional functionality, according to which it is designed to assign each determined type of washware to a previously defined or definable washware group.

For example, the sorting arrangement is configured to sort the washware carried via the feed conveyor belt according to at least the following washware groups:

a first washware group, which comprises cutlery and/or pieces of cutlery made of metal, in particular stainless steel;
  a second washware group, which comprises trays and tray-like articles made of a plastic material; and
  a third washware group, which comprises dishes, in particular plates, cups and/or bowls, made of porcelain or a porcelain-like material.

With the aid of this classification, care is taken to ensure that washware of different types of washware, which can be sorted into identical conveying tracks in the intake or loading region of the conveyor dishwasher arrangement, is combined into one washware group.

It is in particular advantageous that the sorting arrangement comprises a large number of sorting stations, in which the washware delivered via the feed conveyor belt is successively sorted into the previously defined washware groups. These sorting stations are preferably arranged one behind the other looking in the conveying direction of the feed conveyor belt.

In order for the automatic loading system to operate fully automatically, the sorting arrangement and/or the individual sorting stations of the sorting arrangement are respectively associated with at least one loading arrangement per washware group.

In the abovementioned example, in which the sorting arrangement is configured to sort the washware delivered via the feed conveyor belt according to the stated three washware groups, the sorting arrangement is preferably associated with a first loading arrangement for automatically loading a first conveying track of one of the conveyor dishwashers of the conveyor dishwasher arrangement with washware of the first washware group, whereby the sorting arrangement is preferably further associated with a second loading arrangement for automatically loading a second conveying track of one of the conveyor dishwashers of the conveyor dishwasher arrangement with washware of the second washware group, and whereby the sorting arrangement is preferably further associated with a third loading arrangement for automatically loading a third conveying track of one of the conveyor dishwashers of the conveyor dishwasher arrangement with washware of the third washware group.

In order to be compatible with the two previously described expansion stages for the automation of manual loading and unloading work steps, looking in the conveying direction of the feed conveyor belt, the third loading arrangement is preferably disposed upstream of the first and second loading arrangement, whereby the first loading arrangement is preferably disposed upstream of the second loading arrangement.

According to preferred implementations of the loading system according to the invention, the third loading arrangement, which is configured to automatically load a conveyor dishwasher of the conveyor dishwasher arrangement or a dedicated conveying track of a conveyor dishwasher of the conveyor dishwasher arrangement with washware of the third washware group, comprises at least one manipulator, which is configured to grip the washware items of the third washware group delivered via the feed conveyor belt, remove them from the feed conveyor belt and set them down at a previously defined or definable dedicated position.

This previously defined or definable dedicated position is a region of a conveyor belt of a conveyor dishwasher, for example, in particular the main conveyor belt of a conveyor dishwasher.

Alternatively, however, it is also conceivable that the previously defined or definable dedicated position is in a region that is preferably located outside the conveyor dishwasher and serves as a placement area for forming a stack of washware items, in particular a stack of dishes.

According to preferred implementations of the loading system according to the invention, the at least one manipulator of the third loading arrangement comprises a gripper system having at least one set of gripping tongs and/or having at least one suction gripper. The manipulator of the third loading arrangement is configured to grip the washware items of the third washware group delivered via the feed conveyor belt, remove them from the feed conveyor belt and set them down at the stated previously defined or definable dedicated position, whereby said position is either a region of a conveyor belt, in particular the main conveyor belt, of a conveyor dishwasher of the conveyor dishwasher arrangement or a placement area outside of the conveyor dishwasher. The at least one manipulator of the third loading arrangement can optionally or additionally comprise an actuatable magnet for cutlery or pieces of cutlery, so that there is no need for a separately implemented cutlery lifting magnet.

In this context, it is conceivable for the at least one manipulator of the third loading arrangement to have a starting position, in which the gripper system of the manipulator is disposed above the feed conveyor belt such that, during their transport, washware items of the third washware group are conveyed by the feed conveyor belt into the gripping region of the at least one set of gripping tongs and/or the at least one suction gripper.

The starting position of the at least one manipulator of the third loading arrangement is preferably selected such that, during transport, only washware items of the third washware group, but not washware items of the first or second washware group, are conveyed by the feed conveyor belt into the gripping region of the at least one set of gripping tongs and/or the at least one suction gripper. This can, for example, be implemented by vertically spacing the gripper system in a suitable manner from the plane in which the feed conveyor belt is located.

It is generally advantageous for the gripper system of the at least one manipulator of the third loading arrangement to be associated with a corresponding sensor system, which is configured to detect the presence of at least one washware item, and in particular at least one washware item of the third washware group, in the gripping region of the at least one set of gripping tongs and/or in the gripping region of the at least one suction gripper. In this context, it is also conceivable that a suitable control device is provided, which is configured to initiate gripping by the at least one set of gripping tongs and/or the at least one suction gripper when the sensor system associated with the gripper system determines that at least one washware item, and in particular at least one washware item of the third washware group, is located in the gripping region of the at least one set of gripping tongs and/or in the gripping region of the at least one suction gripper.

In this context, it is useful for the control device to further be configured to actuate the at least one manipulator of the third loading arrangement such that said manipulator removes the at least one washware item gripped by the gripper system from the feed conveyor belt and sets it down at a previously defined or definable dedicated position, such as on the main conveyor belt of a conveyor dishwasher of the conveyor dishwasher arrangement.

In a further development of the last mentioned embodiments, the gripper system of the at least one manipulator of the third loading arrangement is associated with a positioning aid comprising at least one guide element, whereby the at least one guide element is configured to preferably guide only washware of the third washware group delivered via the feed conveyor belt in the direction of the gripping region of the at least one set of gripping tongs and/or in the direction of the gripping region of the at least one suction gripper.

The gripper system can alternatively or additionally be associated with a preferably optically operating identification system to automatically identify the washware delivered via the feed conveyor belt, and in particular washware of the third washware group. In this embodiment, it is useful to provide a control device, which is configured to move the manipulator of the third loading arrangement with the gripper system to the washware item when the identification system identifies a washware item of the third washware group in the washware delivered via the feed conveyor belt.

The invention relates not only to a loading system for preferably fully automatically loading different conveying tracks of at least one conveyor dishwasher of a conveyor dishwasher arrangement, but also to a corresponding conveyor dishwasher arrangement comprising such a loading system.

The conveyor dishwasher arrangement in particular comprises at least one conveyor dishwasher having different conveying tracks, preferably in the form of a respective conveyor belt, and a loading system of the type according to the invention described above, whereby the sorting arrangement of the loading system is associated with at least one loading arrangement for each conveying track of the at least one conveyor dishwasher for preferably automatically placing washware of a specific washware group into the conveying track of the at least one conveyor dishwasher associated with the at least one loading arrangement.

According to preferred implementations of the conveyor dishwasher arrangement according to the invention, the sorting arrangement of the loading system is configured to sort the washware delivered via the feed conveyor belt according to at least the following washware groups:

a first washware group, which comprises cutlery and/or pieces of cutlery made of metal, in particular stainless steel;

a second washware group, which comprises trays and tray-like articles made of a plastic material; and a third washware group, which comprises dishes, in particular plates, cups and/or bowls, made of porcelain or a porcelain-like material.

The sorting arrangement is preferably associated with a first loading arrangement for automatically loading a first conveying track of the at least one conveyor dishwasher with washware of the first washware group, whereby the sorting arrangement is preferably associated with a second loading arrangement for automatically loading a second conveying track of the at least one conveyor dishwasher with washware of the second washware group, and whereby the sorting arrangement is preferably associated with a third loading arrangement for automatically loading a third conveying track of the at least one conveyor dishwasher with washware of the third washware group.

The first and/or second conveying track can be part of a conveyor apparatus of a first conveyor dishwasher, while the third conveying track can be part of a conveyor apparatus of a second conveyor dishwasher.

BRIEF DESCRIPTION OF THE DRAWINGS

Example embodiments of the solution according to the invention are described in more detail in the following with reference to the drawings.

The figures show:

FIG. 6 schematically and in an isometric view, the loading region of a conveyor dishwasher comprising an example embodiment of the loading system according to the invention, in which a corresponding loading arrangement is used for automatically loading a tray track running parallel to a main conveyor belt of the conveyor dishwasher and for automatically loading a cutlery track running parallel to the main conveyor belt;

FIG. 7A, B schematically and in a plan view and cross-sectional view, the main conveyor belt and the parallel tray and cutlery tracks of the conveyor dishwasher according to FIG. 6.

DETAILED DESCRIPTION

Figure 1:
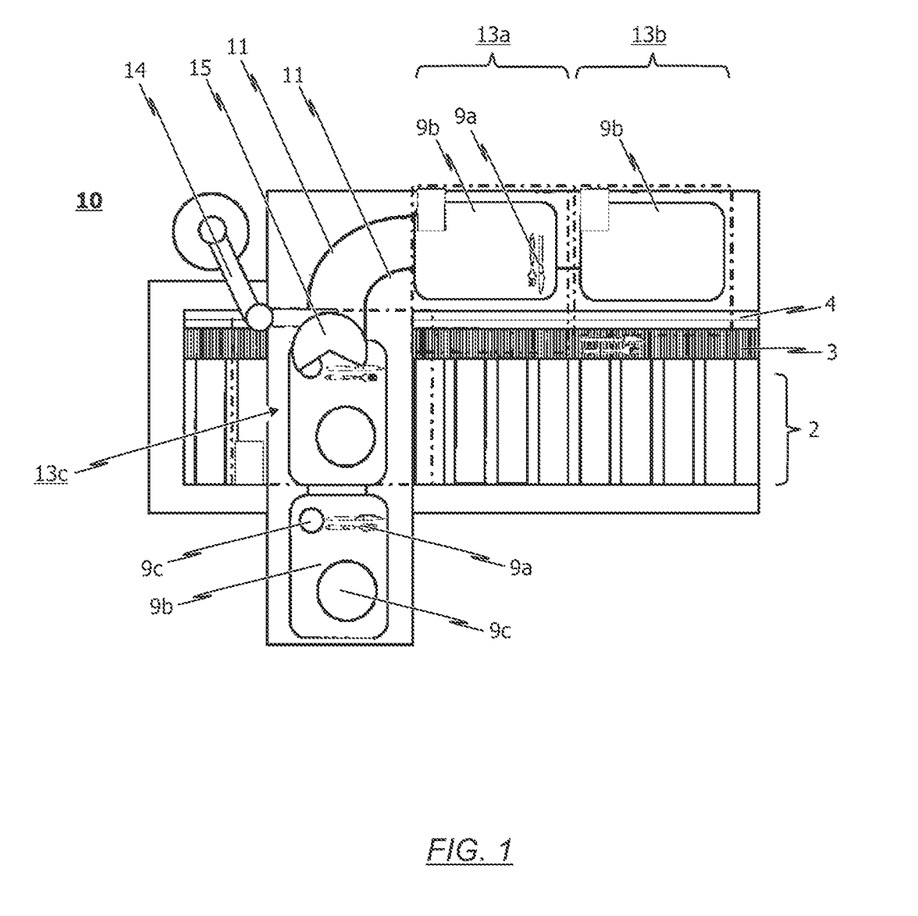
FIG. 1 schematically and in a plan view, the loading region of a conveyor dishwasher comprising an example embodiment of the loading system according to the invention.

Schematically and in a plan view, FIG. 1 shows the loading region of an only partially shown conveyor dishwasher 1. The conveyor dishwasher 1 comprises a conveyor apparatus (main conveyor belt 2, cutlery conveyor belt 3, tray conveyor belt 4) for transporting washware 9a, 9b, 9c through the conveyor dishwasher 1 in a conveying direction. The conveyor apparatus is in particular configured to allow a plurality of types of washware disposed next to one another to be treated simultaneously in the treatment zones of the conveyor dishwasher 1 and thus make the entire washing and rinsing process more efficient, as a result of which in particular the working time of the washing personnel can be decreased and the consumption of resources of the dishwasher 1 can be reduced.

The conveyor dishwasher 1 considered here comprises at least one wash zone, such as a prewash zone and a main wash zone, which, looking in the conveying direction of the washware 9a, 9b, 9c, is disposed behind the prewash zone. Looking in the conveying direction, a postwash zone is preferably provided behind the at least one wash zone, and at least one final rinse zone, such as a fresh water final rinse zone and/or a pump final rinse zone, is provided behind the postwash zone. Viewed in the conveying direction of the washware 9a, 9b, 9c, the at least one final rinse zone is followed by a drying zone.

The respective zones of the conveyor dishwasher 1 can be separated from one another by separating curtains. It is also conceivable for the entrance tunnel of the conveyor dishwasher 1, which, looking in the conveying direction, is provided behind the loading region of the conveyor dishwasher 1, to be separated from the entrance of the conveyor dishwasher 1 by a separating curtain. Providing separating curtains can prevent washing liquid and final rinsing liquid splashing out and steam escaping from the conveyor dishwasher 1.

The treatment zones of the conveyor dishwasher 1 are associated with spray nozzles. These spray nozzles are used to spray liquid onto the washware 9a, 9b, 9c to be treated as said washware is transported through the respective treatment zones by the conveyor apparatus. The individual spray systems of the treatment zone ensure that the washware 9a, 9b, 9c to be treated is sprayed from both the top and the bottom.

In the embodiment shown schematically in FIG. 1, a system 10 for loading the conveyor dishwasher 1 is provided at the loading region of the conveyor dishwasher 1. The loading system 10 comprises an associated feed conveyor belt 11, via which washware 9a, 9b, 9c can be delivered to the loading region of the conveyor dishwasher 1.

The loading system 10 further comprises a sorting arrangement to sort the washware 9a, 9b, 9c delivered to the loading region of the conveyor dishwasher 1 via the feed conveyor belt 11 according to previously defined or definable washware groups.

More specifically, in the example embodiment shown in FIG. 1, the sorting arrangement is configured to sort the washware 9a, 9b, 9c delivered via the feed conveyor belt 11 according to the following washware groups:

a first washware group, which comprises cutlery and/or pieces of cutlery 9a made of metal, in particular stainless steel;

a second washware group, which comprises trays and tray-like articles 9b made of a plastic material; and a third washware group, which comprises dishes 9c, in particular plates, cups and/or bowls, made of porcelain or a porcelain-like material.

It is generally conceivable for the sorting arrangement to further be configured to additionally sort the washware 9a, 9b, 9c delivered via the feed conveyor belt 11 according to at least one of the following washware groups:

a fourth washware group, which comprises drinking glasses and/or bowls made of glass or a glass-like material; and a fifth washware group, which comprises containers, in particular GN containers, pots and/or pans made of a metal, in particular stainless steel.

The loading system 10 according to the invention, which is schematically shown according to an example embodiment in FIG. 1 in a plan view, further comprises at least one loading arrangement 13a, 13b, 13c associated with the sorting arrangement, to automatically load the conveyor dishwasher 1 and more specifically respective tracks or regions of the conveyor belt (e.g. main conveyor belt 2, cutlery conveyor belt 3, tray conveyor belt 4) of the conveyor dishwasher 1 with washware 9a, 9b, 9c of one the previously defined or definable washware groups.

For example, in the solution schematically shown in FIG. 1, a first loading arrangement 13a is provided, which is configured to automatically load the conveyor dishwasher 1, and more specifically a cutlery track 3 running parallel to a main conveyor belt 2 of the conveyor dishwasher 1, with washware 9a of the first washware group (i.e. with cutlery and/or pieces of cutlery made of a metal, in particular stainless steel).

A second loading arrangement 13b, which is configured to automatically load the conveyor dishwasher 1, and more specifically a tray track 4 running parallel to the main conveyor belt 2 of the conveyor dishwasher 1, with washware 9b of the second washware group (i.e. with trays and tray-like articles made of a plastic material), is used as well.

In addition, in the example embodiment shown in FIG. 1, a third loading arrangement 13c is used, which is configured to automatically load the conveyor dishwasher 1, and more specifically the main conveyor belt 2 of the conveyor dishwasher 1, with washware 9c of the third washware group (i.e. with dishes made of porcelain or a porcelain-like material).

It is provided, for example, that, looking in the conveying direction of the feed conveyor belt, the third loading arrangement 13c is disposed upstream of the first and second loading arrangement 13a, 13b. In the embodiment shown in FIG. 1, it is further provided that the first loading arrangement 13a is disposed upstream of the second loading arrangement 13b.

In the example embodiment shown in FIG. 1, the third loading arrangement 13c comprises a manipulator 14, which is configured to in particular grip washware items 9c of the third washware group, remove them from the feed conveyor belt 11 and set them down at a previously defined or definable dedicated position.

This previously defined or definable dedicated position is a position in a region of the conveyor belt (conveyor belt) of the conveyor dishwasher 1, in particular in a region of a main conveyor belt 2 of the conveyor dishwasher 1.

Alternatively, however, it is also generally conceivable for the previously defined or definable dedicated position to be in a region that is preferably located outside the conveyor dishwasher 1 and serves as a placement area for forming a stack of dishes.

As can be seen from the plan view in FIG. 1, in the example embodiment of the loading system 10 according to the invention, it is provided, for example, that the at least one manipulator 14 of the third loading arrangement 13c comprises a gripper system 15 having at least one set of gripping tongs.

As an alternative or in addition to gripping tongs, however, it would also be conceivable for the gripper system 15 of the third loading arrangement 13c to comprise at least one suction gripper.

It is generally advantageous for the manipulator 14 of the third loading arrangement 13c to be configured to use the gripper system 15 to in particular grip washware 9c of the third washware group, remove it from the feed conveyor belt 11 and set it down at the previously defined or definable dedicated position.

In this context, it is conceivable for the at least one manipulator 14 of the third loading arrangement 13c to have a starting position or waiting position, in which the gripper system 15 of the manipulator 14 is disposed above the feed conveyor belt 11 such that, during their transport, washware items 9c of the third washware group are conveyed by the feed conveyor belt 11 into the gripping region of the at least one set of gripping tongs.

Figure 2A:
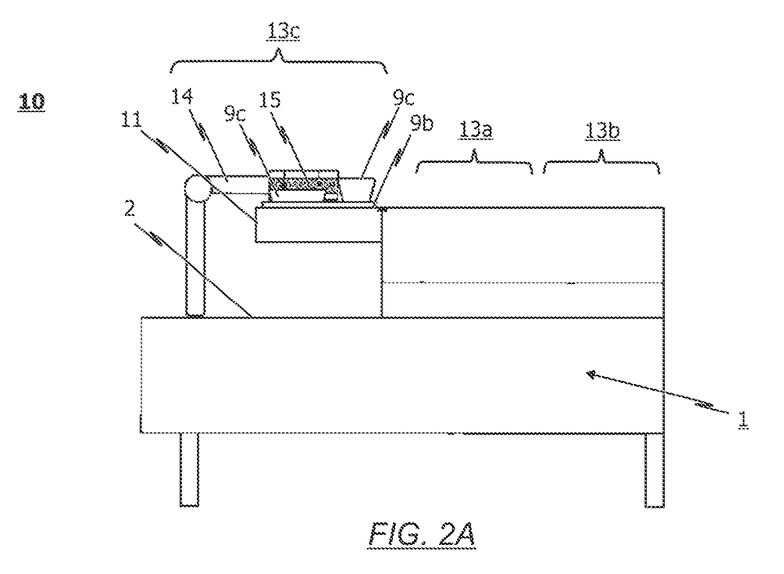
FIG. 2A schematically and in a side view, an example embodiment of the loading system according to the invention in a first state, in which a manipulator of the loading system is in its starting position or waiting position.

In this context, reference is made to the schematic illustration according to FIG. 2A. More specifically, schematically and in a side view, FIG. 2A shows an example embodiment of the loading system 10 according to the invention in a first state, in which a manipulator 14 of the loading system 10 is in its starting position or waiting position.

The starting position or waiting position of the at least one manipulator 14 of the third loading arrangement 13c is in particular selected such that, during transport, only washware items 9c of the third washware group, but not washware items 9a, 9b of the first or second washware group, are conveyed by the feed conveyor belt 11 into the gripping region of the at least one set of gripping tongs.

The gripper system 15 of the at least one manipulator 14 of the third loading arrangement 13c is advantageously associated with a sensor system, which is configured to detect the presence of at least one washware item 9a, 9b, 9c, and in particular at least one washware item 9c of the third washware group, in the gripping region of the at least one set of gripping tongs.

The loading system 10 is preferably associated with a control device, which is configured to initiate gripping by the at least one set of gripping tongs when the sensor system associated with the gripper system 15 determines that at least one washware item 9a, 9b, 9c, and in particular at least one washware item 9c of the third washware group, is located in the gripping region of the at least one set of gripping tongs.

According to advantageous implementations, the control device is preferably further configured to actuate the at least one manipulator 14 of the third loading arrangement 13c such that said manipulator removes the at least one washware item gripped by the gripper system 15 from the feed conveyor belt 11 and sets it down at a previously defined or definable dedicated position.

Figure 2B:
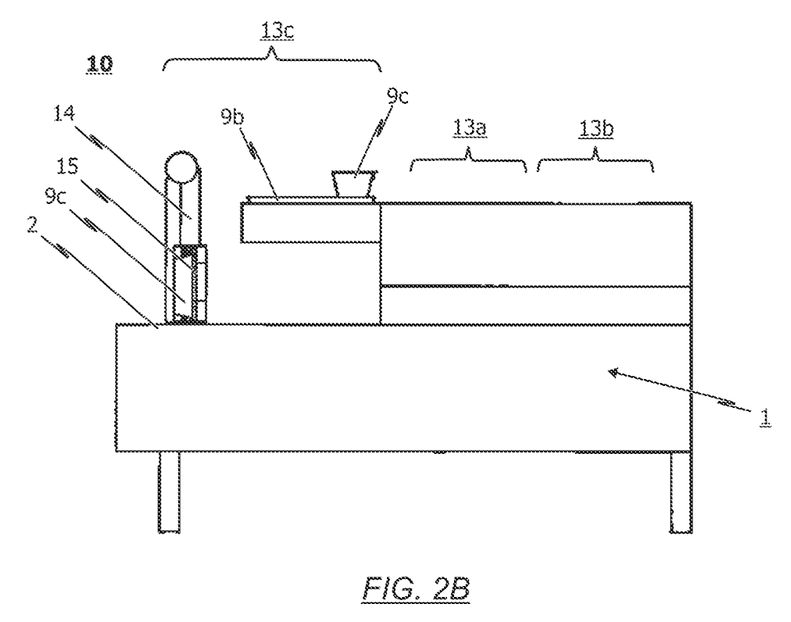
FIG. 2B schematically and in a side view, the loading system according to FIG. 2A in a second state, in which the manipulator of the loading system is in its loading position.

Schematically and in a side view, FIG. 2B for example, shows the loading system 10 according to FIG. 2A in a second state, in which the manipulator 14 of the loading system 10 is in its loading position.

It is generally useful for the gripper system 15 of the at least one manipulator 14 of the third loading arrangement 13c to in particular be associated with a positioning aid comprising at least one guide element, whereby the at least one guide element is configured to preferably guide only washware 9c of the third washware group delivered via the feed conveyor belt 11 in the direction of the gripping region of the at least one set of gripping tongs of the gripper system 15.

According to further developments, it is provided that the gripper system 15 is associated with a preferably optically operating identification system 16 to automatically identify the washware 9a, 9b, 9c delivered via the feed conveyor belt 11, in particular washware 9c of the third washware group. In this context, reference is made to the illustrations in FIG. 3A and FIG. 3B.

Figure 3A:
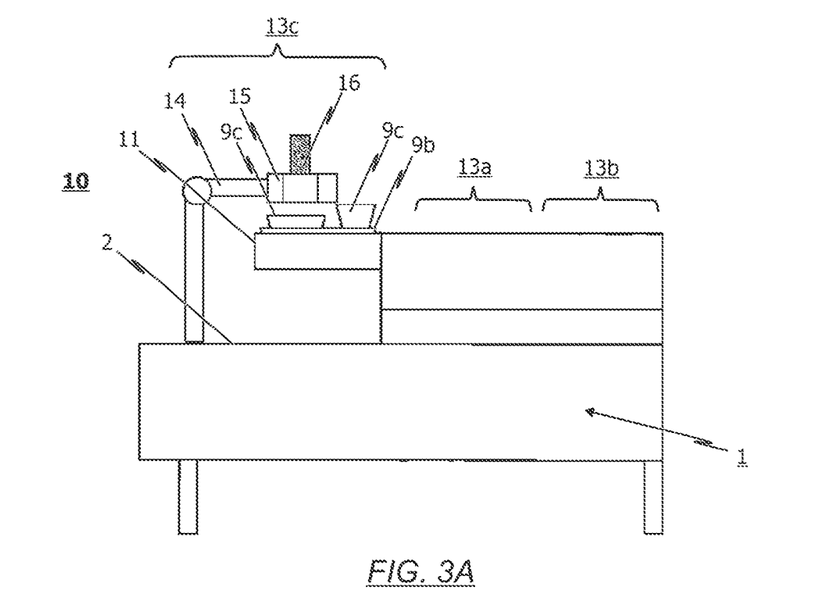
FIG. 3A schematically and in a side view, an example embodiment of the loading system according to the invention in a first state, in which a manipulator of the loading system is in its starting position or identifying position.
Figure 3B:
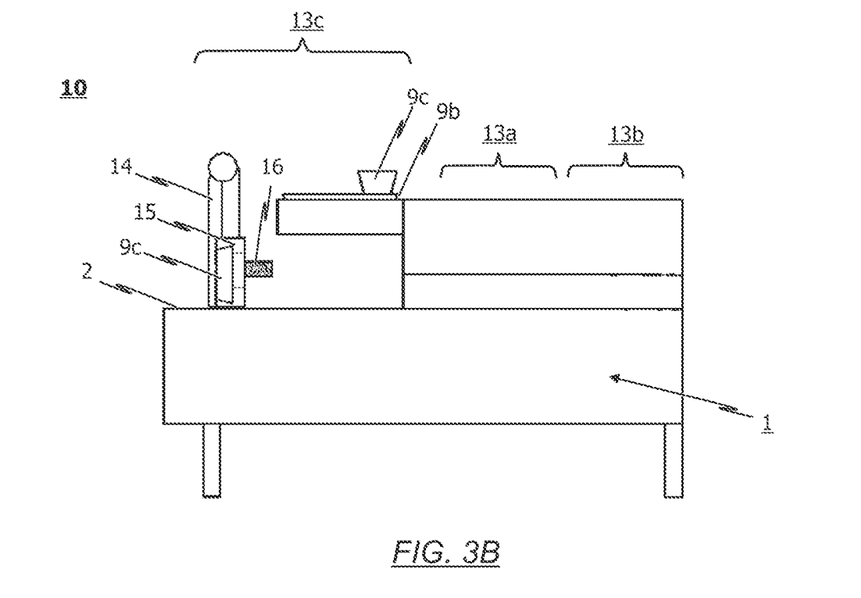
FIG. 3B schematically and in a side view, the loading system according to FIG. 3A in a second state, in which the manipulator of the loading system is in its loading position.

More specifically, schematically and in a side view, FIG. 3A shows an example embodiment of the loading system 10 according to the invention in a first state, in which a manipulator 14 of the loading system 10 is in its starting position or identifying position. On the other hand, schematically and in a side view, FIG. 3B shows the loading system 10 according to FIG. 3A in a second state, in which the manipulator 14 of the loading system 10 is in its loading position.

In this embodiment, the control device associated with the loading system 10 should be configured to move the manipulator 14 of the third loading arrangement 13c with the gripper system 15 to the washware item 9c when the identification system 16 in particular identifies a washware item 9c of the third washware group in the washware 9a, 9b, 9c delivered via the feed conveyor belt 11.

In the solutions illustrated schematically in FIG. 2A and in FIG. 3A, the starting position of the manipulator 14 is respectively disposed above the feed conveyor belt 11. The manipulator 14 is equipped with the gripper system 15.

In the solution shown in FIG. 2A, the gripper system 15 itself is equipped with a sensor which detects the presence of washware 9a, 9b, 9c, and in particular washware 9c of the third washware group, in the gripping region of the at least one gripper of the gripper system 15.

As soon as washware 9a, 9b, 9c is conveyed via the feed conveyor belt 11 into the gripping region of the at least one gripper of the gripper system 15, it is detected by the sensor and the gripper closes independently. The washware 9a, 9b, 9c is thus held securely in the gripper system 15.

In the next step, the manipulator 14 removes the washware item 9c from the tray 9b. The washware item 9c is then ideally sorted into the main conveyor belt 2 of the conveyor dishwasher 1. For this purpose, the manipulator 14 performs a pivoting movement, for example, and places the washware item 9c parallel to the transport compartments into which the main conveyor belt 2 is divided. If there is a transport compartment below the washware item 9c, the gripper of the gripper system 15 opens and thus loads the washware item 9c into the main conveyor belt 2 (see FIG. 2B).

As already stated, the manipulator 14 can alternatively set the washware item 9c down onto a dedicated placement area and thus form a stack of dishes. This can then be sorted into the main conveyor belt 2 by the service personnel.

Depending on the manipulator 14 and gripper system 15 used, an additional positioning aid which aligns the washware 9c on the tray can be integrated. The manipulator 14 can then grip the washware 9c more efficiently and remove it from the tray 9b.

As in the first solution illustrated schematically in FIGS. 2A and 2B, in the second solution shown in FIGS. 3A and 3B the starting position of the manipulator 14 is above the feed conveyor belt 11. In contrast to the gripper system 15 according to FIG. 2A, however, the gripper system 15 according to FIG. 3A is associated with a preferably optically operating identification system 16 to automatically identify the washware 9a, 9b, 9c delivered via the feed conveyor belt 11, in particular washware 9c of the third washware group.

The optically operating identification system 16 can, for example, be implemented as a camera system, with which the gripper system 15 of the manipulator 14 is equipped. With the aid of said optically operating identification system 16 or camera system, the washware items 9c and their position on the trays 9b, which are continuously being conveyed to the intake region of the conveyor dishwasher 1 via the feed conveyor belt 11, are identified.

A control device is furthermore provided which is configured to move the manipulator 14 of the third loading arrangement 13c with the gripper system 15 to the washware item 9c when the identification system 16 identifies a washware item 9c of the third washware group in the washware 9a, 9b, 9c delivered via the feed conveyor belt 11.

For this purpose, the manipulator arm is in its waiting or identifying position above the feed conveyor belt 11 (see FIG. 3A). When a place setting is transported past the optically operating identification system 16 with the aid of the feed conveyor belt 11, the positions of the individual dishes 9c are acquired first. The manipulator 14 then automatically positions itself at a corresponding dish 9c. With the aid of the optically operating identification system 16, it is ensured that the dish 9c is properly picked up and held securely by the gripper system 15.

In a next step, the manipulator 14 removes the washware item 9c from the tray 9b. The washware item 9c is then ideally sorted into the main conveyor belt 2 of the conveyor dishwasher 1. For this purpose, the manipulator 14 performs a pivoting movement and places the washware item 9c parallel to the transport compartments into which the main conveyor belt 2 is divided. If there is a transport compartment below the dish, the gripper system 15 opens and thus loads the dish 9c into the main conveyor belt (see FIG. 3B).

With this solution, too, an alternative is to place the washware item 9c onto a dedicated placement area with the aid of the manipulator 14 and thus form a stack of dishes. This can then be sorted into the main conveyor belt by the service personnel.

Depending on the manipulator 14 and gripper system 15 used, an additional positioning aid which aligns the washware 9c on the tray 9b can be integrated here too. The manipulator 14 can then grip the washware 9c more efficiently and remove it from the tray 9b.

Combining the gripper system 15 and the optically operating identification system 16/camera system has the advantage that the washware 9c is identified by the optically operating identification system 16/camera system before each gripping procedure.

This allows additional work steps to be carried out by the service personnel, such as removing waste from the place settings, removing glasses from the trays, as well as loading additional washware, such as washware of the fourth or fifth washware group, from the tray directly into the conveyor dishwasher 1 and taking pieces of cutlery 9a out from among other washware.

Displacing washware items 9c on the tray 9b during the manual work steps has no effect on the operation of the manipulator 14, since the washware items 9c are detected by the optically operating identification system 16 only shortly before they are removed from the tray 9b.

In comparison, with an upstream optically operating identification system 16, no manual work steps are permitted between the identification system 16 and the manipulator 14. The identification system 16 detects the washware items 9c of the place setting which is being conveyed to the conveyor dishwasher 1 on the feed conveyor belt 11.

In the next step, the dishes 9c are removed by the manipulator 14. Manual work steps between the identification system 16 and the manipulator 14 can displace the washware items 9c, as a result of which the manipulator 14 cannot remove the washware items from the tray 9b.

Figure 4:
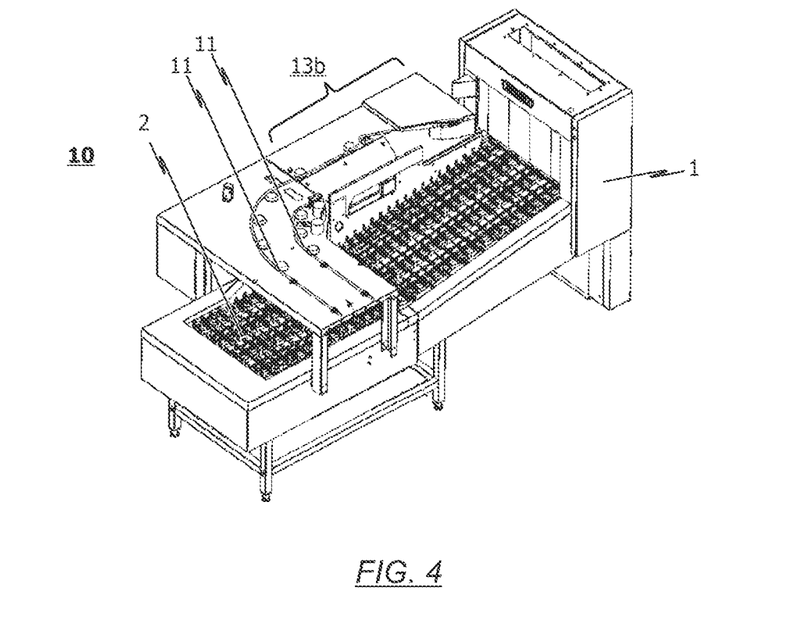
FIG. 4 schematically and in an isometric view, the loading region of a conveyor dishwasher comprising an example embodiment of the loading system according to the invention, in which a corresponding loading arrangement is used for automatically loading a tray track running parallel to a main conveyor belt of the conveyor dishwasher.

Schematically and in an isometric view, FIG. 4 shows the loading region of a conveyor dishwasher 1 comprising an example embodiment of the loading system 10 according to the invention, in which a corresponding loading arrangement 13b (second loading arrangement) is used for automatically loading a tray track 4 running parallel to a main conveyor belt of the conveyor dishwasher 1.

Figure 5A:
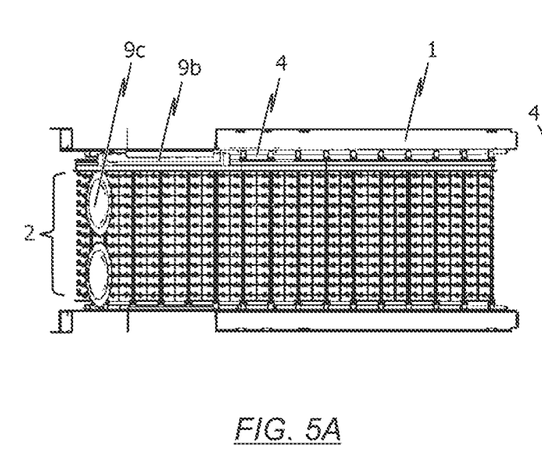
FIG. 5A, B schematically and in a plan view and cross-sectional view, the main conveyor belt and the parallel tray track of the conveyor dishwasher according to FIG. 4.
Figure 5B:
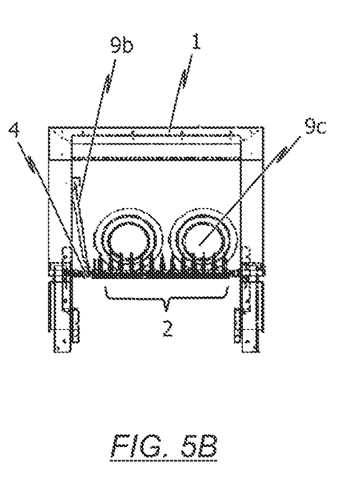

Schematically and in a plan view (FIG. 5A) and in a cross-sectional view (FIG. 5B), FIG. 5A and FIG. 5B show the main conveyor belt 2 and the parallel tray track 4 of the conveyor dishwasher 1 according to FIG. 4.

Figures 6, 7A, 7B:
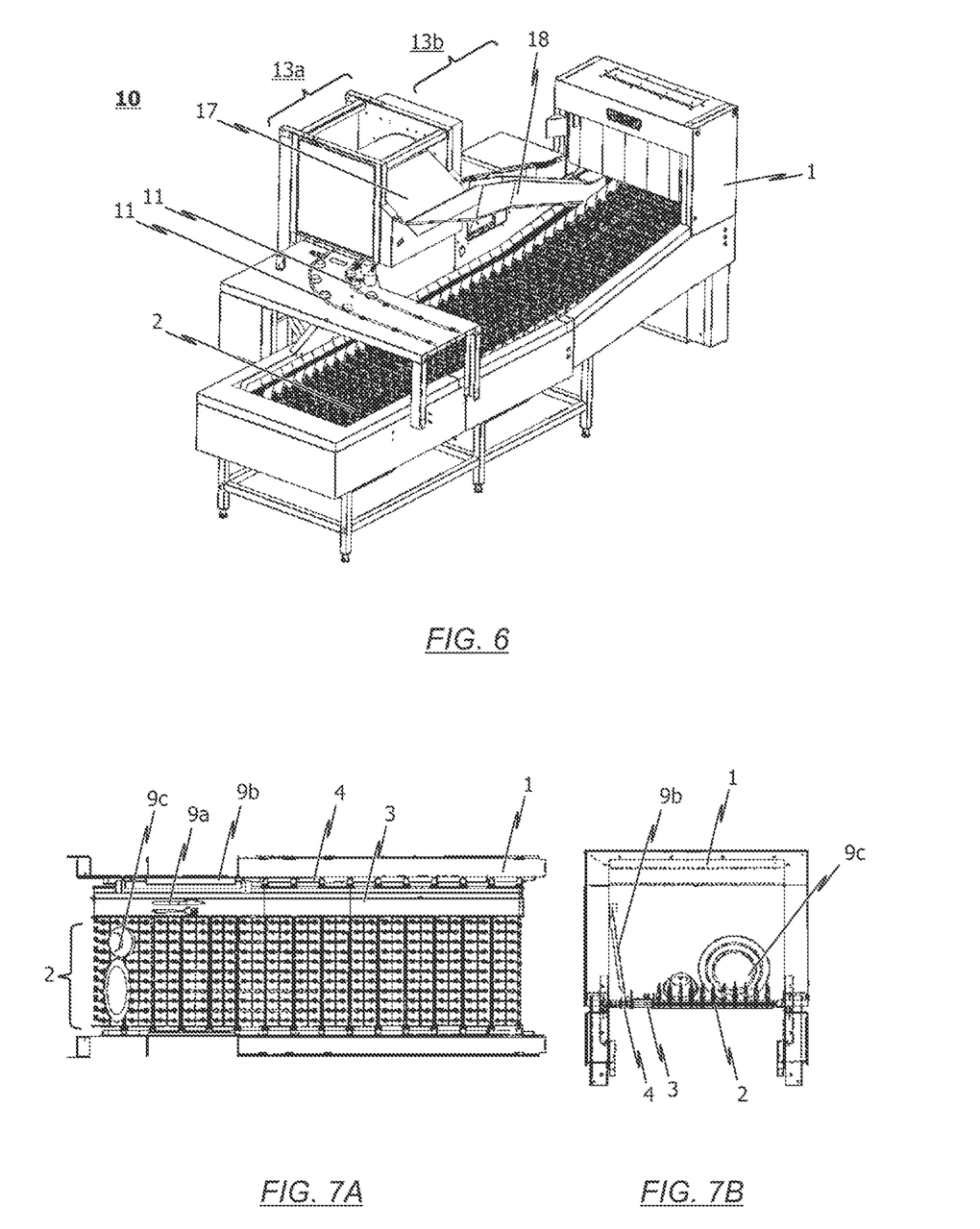

Schematically and in an isometric view, FIG. 6 shows the loading region of a conveyor dishwasher 1, specifically together with a first and a second loading arrangement 13a, 13b, which are associated with the sorting arrangement of the loading system 10 according to the invention. The first loading arrangement 13a is used for automatically loading the conveyor dishwasher 1 with washware 9a of the first washware group, i.e. with cutlery and/or pieces of cutlery made of metal, in particular stainless steel.

Schematically and in a plan view (FIG. 7A) and in a cross-sectional view (FIG. 7B), FIG. 7A and FIG. 7B show the main conveyor belt 2 and the parallel tray and cutlery tracks 4, 3 of the conveyor dishwasher 1 according to FIG. 6.

Looking in the conveying direction of the feed conveyor belt 11, the third loading arrangement 13a is disposed upstream of the second loading arrangement 13b. The second loading arrangement 13b is used to automatically load washware 9b of the second washware group into the conveyor dishwasher 1.

As can be seen from the illustrations in FIG. 7A and FIG. 7B, the conveyor apparatus of the conveyor dishwasher 1 in this embodiment comprises a first conveyor belt 4 for trays or tray-like washware 9b (=tray track), as well as a second conveyor belt 3 for cutlery or cutlery-like items (=cutlery track) running parallel to the first conveyor belt 4, and also a parallel third conveyor belt 2 (=main conveyor belt) for washware 9c of the third washware group.

The first conveyor belt 4 is relatively narrow compared to the third conveyor belt 2, so that a tray or tray-like item of washware 9b can be accommodated by the first conveyor belt 4 only in an upright position and oriented parallel to the conveying direction. Due to the orientation of the washware 9b to be accommodated by the first conveyor belt 4 parallel to the running direction of said first conveyor belt 4, the amount of space needed on the overall belt surface is minimal.

In other words, the first conveyor belt 4 has such a reduced width that only a minimal area of the overall belt surface is occupied by the first conveyor belt 4, which specifically permits the placement of trays or tray-like washware 9b when said washware 9b is in an upright position and oriented parallel to the conveying direction.

The second conveyor belt 3, which is implemented as a cutlery conveyor belt, likewise has a reduced width compared to the third conveyor belt 2.

It is thus possible for the third conveyor belt 2 to still have a sufficient width to remain usable almost without restrictions to transport washware 9c of the third washware group, in particular plates, bowls and/or glasses, through the individual treatment zones of the conveyor dishwashers. Racks of glasses or GN containers, for example, can thus still be placed on the third conveyor belt 2 alongside the tray or tray-like washware 9b accommodated on the first conveyor belt.

FIG. 4 and FIG. 6 respectively show only a portion of the sorting arrangement, namely that region of the sorting arrangement, which, looking in the conveying direction of the feed conveyor, is disposed behind the third loading arrangement 13a, 13b, 13c.

The place settings, from which the washware 9c of the third washware group has already been removed automatically with the aid of the third loading arrangement 13c (not shown in FIG. 4 and FIG. 6), are therefore delivered to the first loading arrangement 13a according to FIG. 4 and FIG. 6 via the feed conveyor belt 11. In the first loading arrangement 13a, the cutlery 9a is removed from the trays 9b with the aid of a cutlery lifting magnet in the form of an actuatable magnet 17, and the pieces of cutlery 9a are then automatically placed into the cutlery track 3 of the belt conveyor dishwasher 1.

The tray 9b is subsequently conveyed to the single cycle device of the second loading arrangement 13b, where it is automatically placed into the corresponding tray track 4 of the conveyor dishwasher 1 (see FIG. 6).

FIG. 6 shows an embodiment of a single cycle device of the second loading arrangement 13b. Briefly summarized, the single cycle device comprises a corresponding guide 18, via which the trays 9b are automatically transferred from their horizontal state to an upright position and then placed into the corresponding tray track 4 of the conveyor dishwasher 1.

An example embodiment of the conveyor dishwasher arrangement according to the invention is described in the following with reference to FIG. 8. More specifically, schematically and in a plan view, FIG. 8 shows the loading regions of a conveyor dishwasher arrangement comprising two conveyor dishwashers with an example embodiment of the loading system according to the invention.

By providing a plurality of conveyor dishwashers 21, 21', each of which comprises at least one conveying track 22, 23, 24, different conveying tracks 22, 23, 24 for different types of washware are made available.

Figure 8:
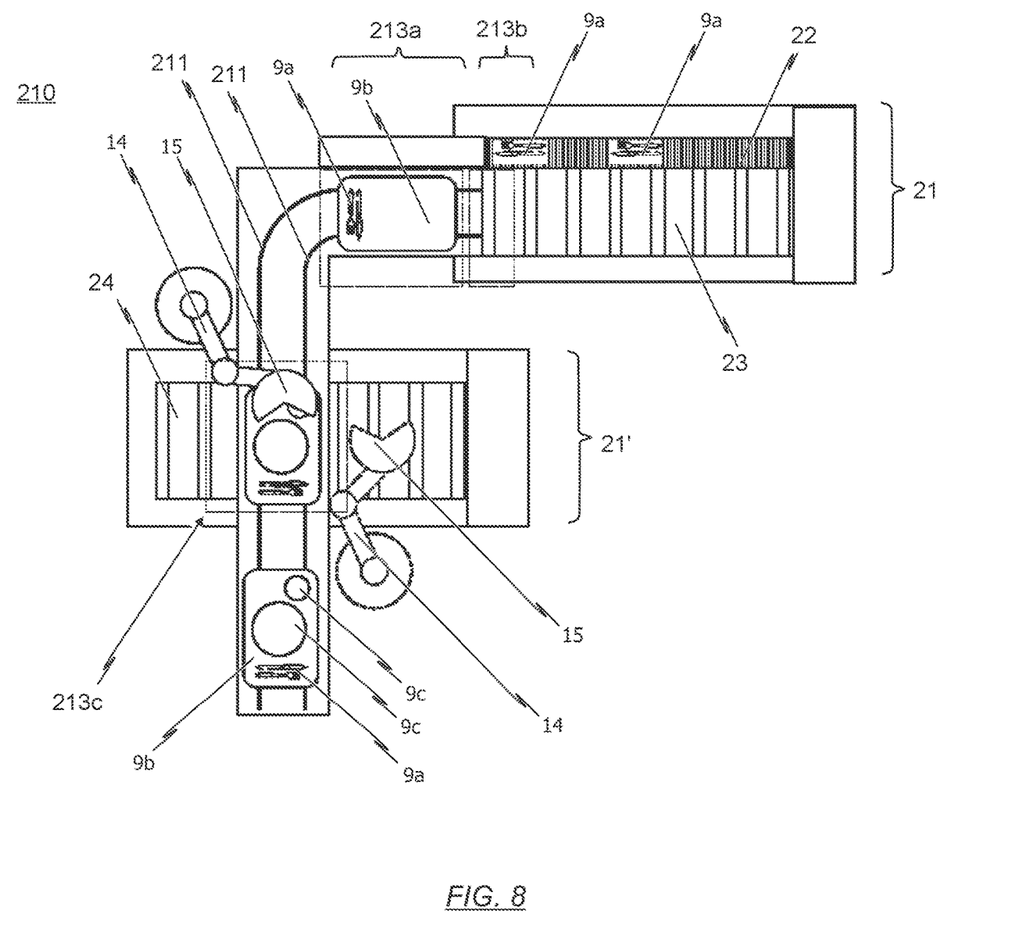
FIG. 8 schematically and in a plan view, the loading regions of a conveyor dishwasher arrangement comprising two conveyor dishwashers with an example embodiment of the loading system according to the invention.

The conveyor dishwasher arrangement shown schematically in FIG. 8 further comprises a loading system 210, which is structurally and functionally the same as the loading system 10 described previously with reference to FIG. 1.

In the conveyor dishwasher arrangement shown schematically in FIG. 8, it is in particular provided that the sorting arrangement of the loading system 210 is associated with at least one loading arrangement 213a, 213b, 213c for each conveying track 22, 23, 24 of the two conveyor dishwashers 21, 21' for the preferably automatic placement of washware 9a, 9b, 9c of a specific washware group into the conveying track 22, 23, 24 of the two conveyor dishwashers 21, 21' associated with the at least one loading arrangement 213a, 213b, 213c.

The sorting arrangement of the loading system 210 is in particular configured to sort the washware 9a, 9b, 9c delivered via the feed conveyor belt 211 according to at least the following washware groups:

a first washware group, which comprises cutlery and/or pieces of cutlery 9a made of metal, in particular stainless steel;

a second washware group, which comprises trays and tray-like articles 9b made of a plastic material; and a third washware group, which comprises dishes 9c, in particular plates, cups and/or bowls, made of porcelain or a porcelain-like material.

In this context it is in particular provided that the sorting arrangement of the loading system 210 is associated with a first loading arrangement 213a for automatically loading a first conveying track 22 of the two conveyor dishwashers 21, 21' with washware 9a of the first washware group, whereby the sorting arrangement is preferably associated with a second loading arrangement 213b for automatically loading a second conveying track 23 of the two conveyor dishwashers 21, 21' with washware 9b of the second washware group, and whereby the sorting arrangement is preferably associated with a third loading arrangement 213c for automatically loading a third conveying track 24 of the two conveyor dishwashers 21, 21' with washware 9c of the third washware group.

As indicated in FIG. 8, it can be provided that the first and second conveying track 22, 23 are part of a conveyor apparatus of a first conveyor dishwasher 21, while the third conveying track 24 is part of a conveyor apparatus of a second conveyor dishwasher 21'.

The invention is not limited to the embodiments shown in the drawings, but results when all of the features disclosed herein are considered together.

What is claimed is:

1. An arrangement of at least one conveyor dishwasher comprising different conveying tracks, and a loading system, wherein the loading system comprises:
a feed conveyor belt for delivering washware to loading regions of the at least one conveyor dishwasher; and
a sorting arrangement for sorting the washware delivered to the loading regions of the at least one conveyor dishwasher via the feed conveyor belt according to previously defined or definable washware groups,
wherein the sorting arrangement includes a first loading arrangement, a second loading arrangement and a third loading arrangement
wherein the previously defined or definable washware groups include at least:
a first washware group, which comprises cutlery and/or pieces of cutlery made of metal;
a second washware group, which comprises trays and tray-like articles made of a plastic material; and
a third washware group, which comprises plates, cups and/or bowls, made of porcelain or a porcelain-like material;
wherein the first loading arrangement is configured for automatically loading a first conveying track of the at least one conveyor dishwasher with washware of the first washware group, wherein the second loading arrangement is configured for automatically loading a second conveying track of the at least one conveyor dishwasher with washware of the second washware group, and wherein the third loading arrangement is configured for automatically loading a third conveying track of the at least one conveyor dishwasher with washware of the third washware group;
wherein the first and/or second conveying track is/are part of a conveyor apparatus of a first conveyor dishwasher, and wherein the third conveying track is part of a conveyor apparatus of a second conveyor dishwasher;
wherein the third loading arrangement comprises at least one manipulator, which is configured to grip washware items of the third washware group, remove them from the feed conveyor belt, and set them down at a previously defined or definable dedicated position;
wherein the at least one manipulator of the third loading arrangement comprises an actuatable magnet for removing washware of the first washware group from the washware delivered via the feed conveyor belt as needed;
wherein the at least one manipulator of the third loading arrangement comprises a gripper system having at least one set of gripping tongs and/or having at least one suction gripper, wherein the manipulator is configured to use the gripper system to grip washware of the third washware group, remove it from the feed conveyor belt and set it down at a previously defined or definable dedicated position;
wherein the at least one manipulator of the third loading arrangement has a starting position, in which, viewed in vertical direction, the gripper system of the manipulator is disposed above the feed conveyor belt such that, during transport, washware items of the third washware group are conveyed by the feed conveyor belt into the gripping region of the at least one set of gripping tongs and/or into the gripping region of the at least one suction gripper, wherein the starting position of the at least one manipulator of the third loading arrangement is selected such that, during transport with the feed conveyor belt, only washware items of the third washware group, but not washware items of the first or second washware group are conveyed into the gripping region of the at least one set of gripping tongs and/or of the at least one suction gripper.

2. The arrangement according to claim 1,
wherein the sorting arrangement is configured to sort the washware items delivered via the feed conveyor belt depending on their material, size and/or shape in accordance with the previously defined or definable washware groups.

3. The arrangement according to claim 1,
wherein the sorting arrangement comprises a plurality of sorting stations which are disposed one behind the other looking in the conveying direction of the feed conveyor belt for successively sorting the washware delivered via the feed conveyor belt.

4. The arrangement according to claim 1,
wherein, looking in the conveying direction of the feed conveyor belt, the third loading arrangement is disposed upstream of the first and second loading arrangements, and wherein the first loading arrangement is disposed upstream of the second loading arrangement.

5. The arrangement according to claim 1,
wherein the previously defined or definable dedicated position is in a region of a third conveying track of the at least one conveyor dishwasher.

6. The arrangement according to claim 1,
wherein the gripper system of the at least one manipulator of the third loading arrangement includes with a sensor system, which is configured to detect the presence of at least one washware item of the third washware group, in the gripping region of the at least one set of gripping tongs and/or in the gripping region of the at least one suction gripper,
wherein a control device is further provided, which is configured to initiate gripping by the at least one set of gripping tongs and/or the at least one suction gripper when the sensor system associated with the gripper system determines that at least one washware item of the third washware group, is located in the gripping region of the at least one set of gripping tongs and/or in the gripping region of the at least one suction gripper,
wherein the control device is further configured to actuate the at least one manipulator of the third loading arrangement such that said manipulator removes the at least one washware item gripped by the gripper system from the feed conveyor belt and sets it down at a previously defined or definable dedicated position; and/or
wherein the first loading arrangement comprises an actuatable magnet for removing washware of the first washware group from washware delivered via the feed conveyor belt.

7. The arrangement according to claim 1,
wherein the gripper system includes a optically operating identification system to automatically identify washware of the third washware group delivered via the feed conveyor belt, wherein a control device is further provided, which is configured to move the manipulator of the third loading arrangement with the gripper system to the washware item when the identification system identifies a washware item of the third washware group in the washware delivered via the feed conveyor belt.

8. The arrangement according to claim 1,
wherein the first and second loading arrangement are implemented in a common region at the end of the feed conveyor belt, wherein a guide is provided in the common region, via which trays delivered by the feed conveyor belt are transferred from a horizontal state to an upright position and placed automatically into a conveying track of the at least one conveyor dishwasher implemented as a tray conveyor belt; and/or wherein the loading arrangements are configured to place washware of the washware groups associated with the respective loading arrangements into dedicated regions of a common conveying track of the conveyor dishwasher and/or into dedicated conveying tracks of the conveyor dishwasher.

9. An arrangement of at least one conveyor dishwasher comprising different conveying tracks, and a loading system, wherein the loading system comprises:
  a feed conveyor belt for delivering washware to loading regions of the at least one conveyor dishwasher; and
  a sorting arrangement for sorting the washware delivered to the loading regions of the at least one conveyor dishwasher via the feed conveyor belt according to previously defined or definable washware groups,
wherein the sorting arrangement includes a first loading arrangement, a second loading arrangement and a third loading arrangement;
wherein the previously defined or definable washware groups include at least:
  a first washware group, which comprises cutlery and/or pieces of cutlery made of metal;
  a second washware group, which comprises trays and tray-like articles made of a plastic material; and
  a third washware group, which comprises plates, cups and/or bowls, made of porcelain or a porcelain-like material;
wherein the first loading arrangement is configured for automatically loading a first conveying track of the at least one conveyor dishwasher with washware of the first washware group, wherein the second loading arrangement is configured for automatically loading a second conveying track of the at least one conveyor dishwasher with washware of the second washware group, and wherein the third loading arrangement is configured for automatically loading a third conveying track of the at least one conveyor dishwasher with washware of the third washware group;
wherein the first and/or second conveying track is/are part of a conveyor apparatus of a first conveyor dishwasher, and wherein the third conveying track is part of a conveyor apparatus of a second conveyor dishwasher.

* * * * *